May 7, 1929.                L. KRONISH                1,711,798
POWDER COMPACT AND METHOD OF MAKING SAME
Filed Jan. 13, 1928
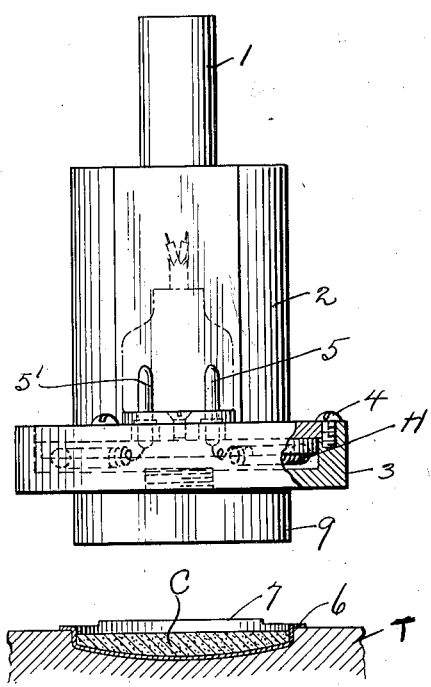
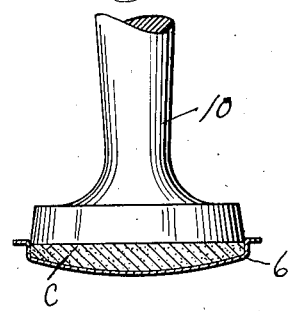
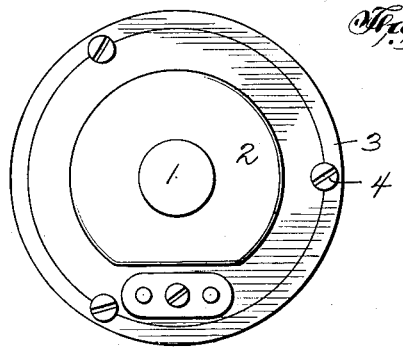
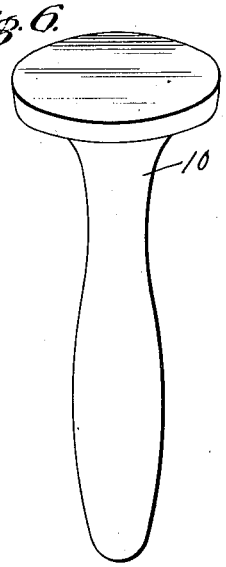
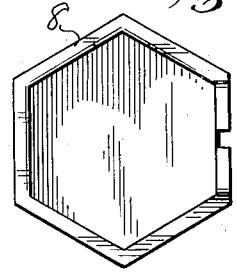
INVENTOR
Louis Kronish
BY
Mock & Blum
ATTORNEYS Patented May 7, 1929.

1,711,798

UNITED STATES PATENT OFFICE.

LOUIS KRONISH, OF NEW YORK, N. Y.

POWDER COMPACT AND METHOD OF MAKING SAME.

Application filed January 13, 1928. Serial No. 246,647.

My invention relates to a new and improved cake or compact of toilet powder, and a new and improved method of making same.

One of the objects of my invention is to produce cake or compact of toilet powder, such as face powder, for example, which shall have a fine and smooth grain or texture.

Another object of my invention is to provide a cake or compact of toilet powder which shall have a very smooth surface, the particles of which shall be very small.

Another object of my invention is to provide an improved method of making a compact having such characteristics, and to provide a method which shall lessen the time required for manufacturing the cake or compact.

Other objects of my invention will be set forth in the following description and drawings, it being understood that the above general statement of the objects of my invention is intended to generally explain the same and not to limit it in any manner.

Fig. 1 shows the apparatus used for finally forming or "setting" the compact.

Fig. 2 is a top view of Fig. 1.

Fig. 3 shows the metal container or dish in which the compact is formed.

Fig. 4 shows the first step in the manufacture of the compact.

Fig. 5 shows the second step in the manufacture of the compact.

Fig. 6 shows the tool utilized in the first step of the manufacture of the compact.

Fig. 7 shows a dish whose contour is different from the dish shown in Fig. 3.

In manufacturing a compact or coherent cake of face powder, it has been customary to take the powder (which ordinarily is perfumed) to then moisten the powder (sometimes adding a binding ingredient) and to form a cake from the moistened powder which is then allowed to dry. While the powder utilized for drying the cake or compact has varied, it has been considered good practice to allow these cakes to dry for about 36 to 48 hours.

The surface of a cake or powder ordinarily made by such methods was rough or granular, especially if the powder had not been very carefully sifted, or if a relatively coarse grade of powder had been utilized in making the powder. According to my invention, a coherent compact having a fine smooth texture and a very smooth surface can be produced, even if a relatively coarse grade of powder is utilized for making the powder.

The metal dish 6 having a raised rim 7 has some adhesive G spread upon the bottom thereof. Some loose powder is then placed into the dish 6, this powder having been mixed with a moistening ingredient so as to make it possible to form a cake. The moistening ingredient ordinarily employed is an emulsion of water and mineral oil. Sometimes a binding ingredient is dissolved in the water, but my invention makes it unnecessary to use a dissolved binding ingredient. A tool 10 made of any suitable material is then applied to the powder so as to form a compressed cake or compact C. The tool 10 is preferably unheated and it is utilized while the powder is in the cold, moist condition. This follows the ordinary practice so as to make a coherent cake of moist powder at room temperature.

The dish 6 containing the compact C is then placed in or upon a table T of a suitable press. The operating member 1 of the press is provided with an enlargement 2 having a flange to which the casing portion 3 is connected by means of screws 4. An electric heater H is located within casing portion 3 as shown in Fig. 1 and this is provided with outside terminals 5 and $5^1$ so that a current can be led through the heater H. An insert 9 having any desired shape can be connected to the member 2 by any well-known connecting means, and this insert 9 is heated by means of the element H. I prefer to heat this element 9 to a temperature equal to or above the boiling point of water, although I do not wish to restrict myself to any particular temperature. The member 9 may have a thread neck 9', which enters casing portion 3. The heated member 9 is now pressed upon the compact C with considerable force. The combined heat and pressure dries the surface of the compact C and also compresses the compact C. The heat also dries the surface of the compact C, although the interior thereof may remain moist because the heat and pressure are utilized for only a short period of time as, for example, for about a second.

The additional time then required for drying or setting the compact is much shorter than if the old method were utilized and in addition the combined heat and pressure causes the surface of the compact to become very smooth due to the fact that the texture of the surface particles is made very fine and even. The interior of the compact C is also made smoother. This treatment leaves the compact in a uniform and friable condition, so that powder can be readily removed therefrom by an ordinary puff. Unless a powder compact is perfectly friable, it is not a commercial product, because the powder must be freely removed therefrom by a soft puff. While the powder is subjected to a relatively high temperature at the surface thereof, this surface heating is continued for a short period of time. If the powder is perfumed, the short surface heating does not result in any substantial loss of perfume, and the subsequent drying period is shorter than if the compact were allowed to dry at ordinary room temperature.

I have described a preferred embodiment of my invention but it is clear that numerous changes and omissions could be made without departing from its spirit.

Thus, while I prefer to use the combined heat and pressure for finally setting the compact, I do not wish to restrict myself to the use of this particular combination of steps, to this particular stage in the manufacture of the compact.

Likewise, although I have shown a conventional form of dish in Fig. 3, I do not wish to restrict myself to this conventional form, because the form of dish 8 shown in Fig. 7 could be utilized.

Likewise, my invention could be utilized for molding cakes or compacts upon plates made of glass, aluminum or any other material utilized in this field.

Heretofore in forming a compact made of moist powder, it was necessary to place a sheet of cloth, rubber or the like between the compacting tool such as the tool 10 and the surface of the powder, or else the powder would stick to the tool thus producing an undesirable rough surface. It was possible to obviate the use of a sheet of cloth, rubber or the like, if the powder was compacted while it was in a dry condition, but this required the use of expensive machinery and very high pressure.

However, by using a heated compacting tool it is unnecessary to use an intermediate sheet of cloth, rubber or the like, because the powder will not stick to the surface of the heated tool.

I claim:—

1. In the art of forming a compact of toilet powder, that step in the art which consists in simultaneously using heat and pressure to form a compact, said heat and pressure being applied for a short period of time to leave the compact in friable condition.

2. In the art of forming a compact of toilet powder, that step in the art which consists in subjecting the moist powder to pressure and heat simultaneously, said pressure and heat being applied for a short period of time to leave the interior of the compact moist.

3. A method of forming a compact of toilet powder which consists in first forming a compact of moist powder without setting the same and while retaining the powder in the moist condition, and then subjecting the compact of moist powder to simultaneous heat and pressure, the use of the said heat and pressure being stopped before the interior of the compact has dried so that the completed compact is friable.

4. In the art of forming a compact of toilet powder, that step in the art which consists in directly applying a heated metal surface under pressure to the powder in moist condition, said metal surface being removed while the interior of the compact is moist.

In testimony whereof I affix my signature.

LOUIS KRONISH.